A. H. REED.
POWER DRIVEN FARM IMPLEMENT.
APPLICATION FILED FEB. 16, 1916.
1,267,803.
Patented May 28, 1918.
3 SHEETS—SHEET 3.
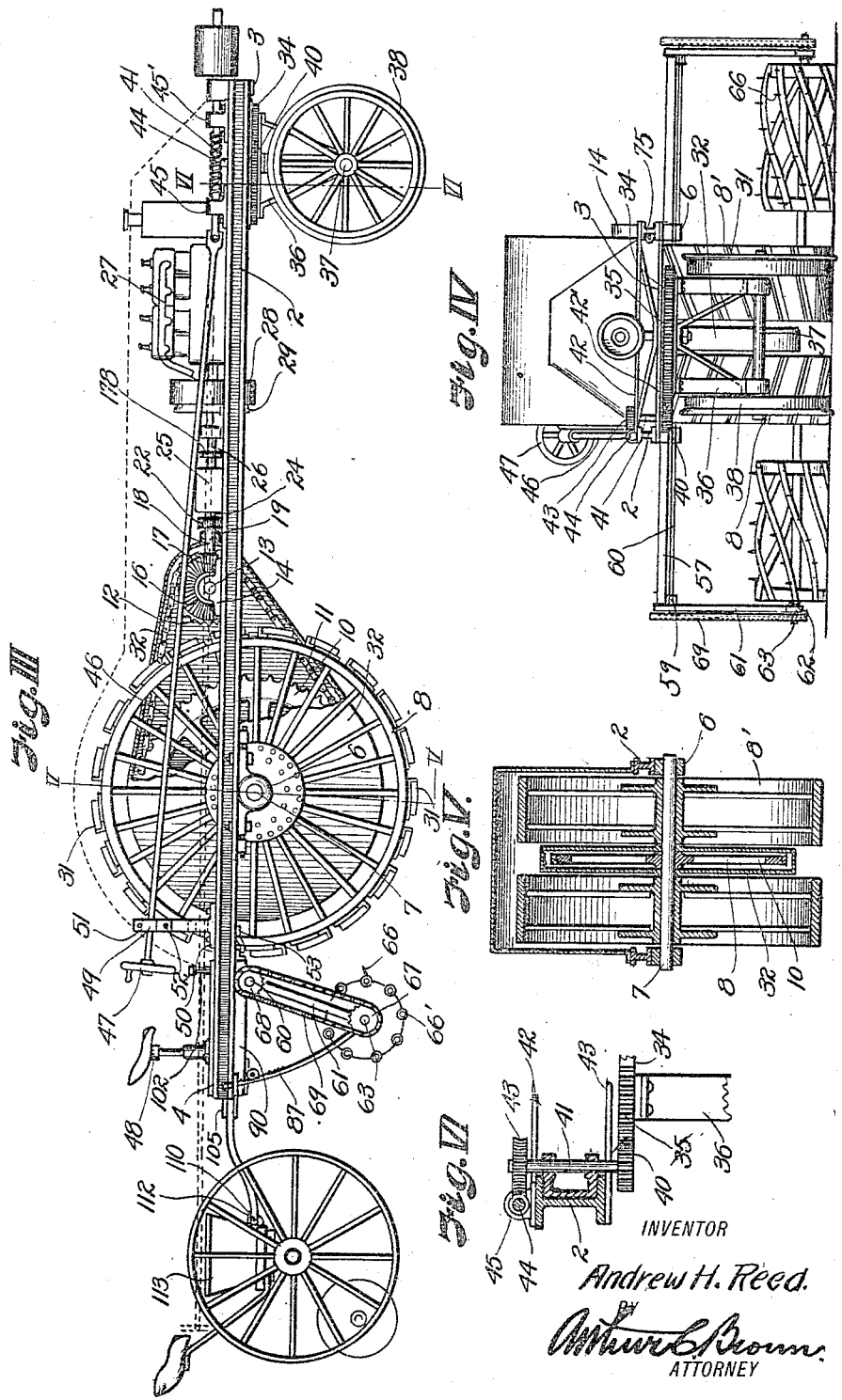
INVENTOR
Andrew H. Reed.
Arthur E. Brown
ATTORNEY

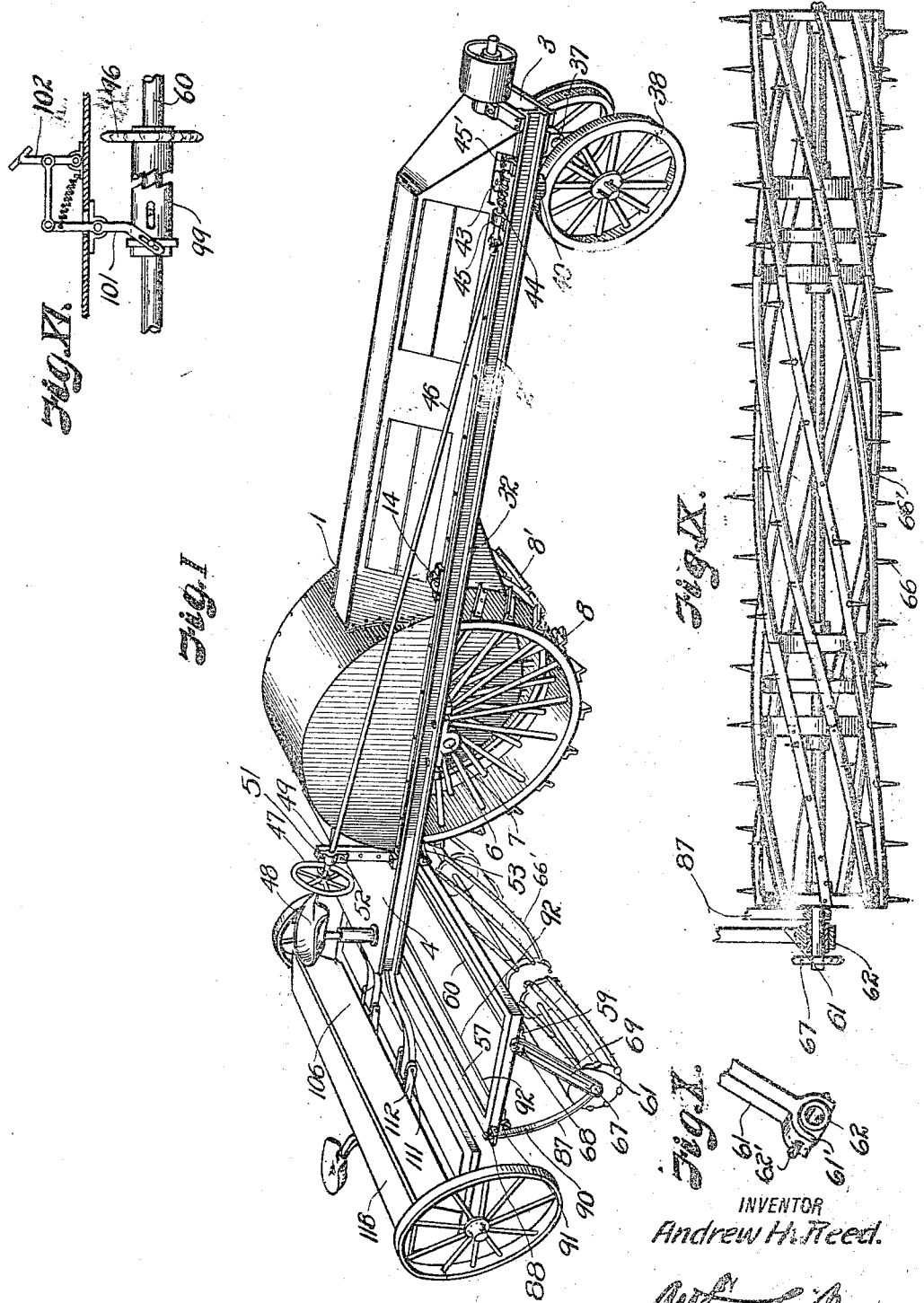

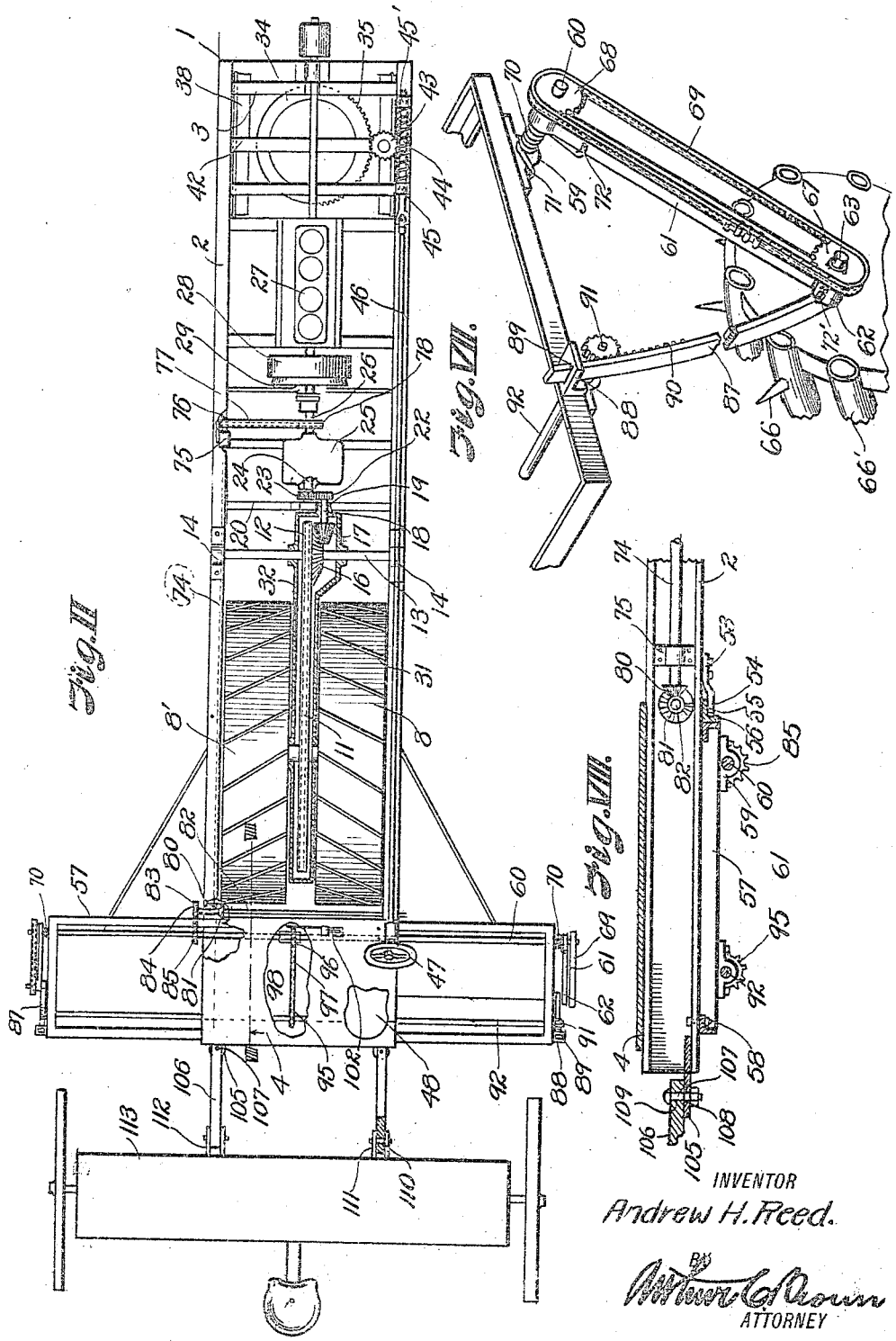

UNITED STATES PATENT OFFICE.

ANDREW H. REED, OF KANSAS CITY, MISSOURI.

POWER-DRIVEN FARM IMPLEMENT.

1,267,803.

Specification of Letters Patent. Patented May 28, 1918.

Application filed February 16, 1916. Serial No. 78,605.

*To all whom it may concern:*

Be it known that I, ANDREW H. REED, a citizen of the United States, residing at Kansas City, in the county of Jackson and State of Missouri, have invented certain new and useful Improvements in Power-Driven Farm Implements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to power driven farm implements, and has for its principal object to provide a tractor which may be operated between rows of standing grain, to cultivate the soil without damage to the standing grain and which is readily adapted for use with any or several ordinary farm implements.

In accomplishing this object I have provided improved details of structure, the preferred forms of which are illustrated in the accompanying drawings, wherein:—

Figure I is a perspective view of an implement containing my improvements, and particularly illustrating the combination of the tractor, followers and the mechanism for connecting the followers with the tractor.

Fig. II is a plan view of the same, parts being broken away for better illustration.

Fig. III is a side elevation of the same.

Fig. IV is a front view of the same.

Fig. V is a vertical section through the drive wheels and their associated parts, on the line V—V, Fig. III.

Fig. VI is an enlarged elevation of part of the steering mechanism on the line VI—VI, Fig. III.

Fig. VII is an enlarged detail perspective view of parts of a follower frame and follower, showing the follower hoisting mechanism.

Fig. VIII is an enlarged vertical section on the line VIII—VIII, Fig. II, particularly illustrating the mounting of the follower frame on the tractor frame and the driving connection of the follower with the tractor motor shaft.

Fig. IX is a side view of the follower.

Fig. X is a detail view of the lower end of the follower arm.

Fig. XI is a detail view of the clutch mechanism for operating the follower hoist.

Referring more in detail to the drawings:—

1 designates a tractor proper, the frame of which comprises side rails 2 that are preferably composed of I-beams and connected at their ends by cross bars 3 and a rear platform 4. The frame beams 2 carry a suspended bearing 6 near their rear ends, and rotatably mounted in said bearings is a shaft 7, to which are fixed a pair of ground wheels 8—8'. The said ground wheels 8—8' are spaced from each other, and fixed to the shaft 7, between the wheels, is a sprocket wheel 10, over which is run a chain belt 11 that is also run over a smaller sprocket wheel 12 on a counter shaft 13 that is mounted in bearings 14 on the frame beams 2.

The wheel 12 is in fixed relation to a miter-gear wheel 16 and meshing with said miter-gear wheel is a pinion 17, which is fixed on a shaft 18 that is journaled in a bearing 19 on a cross bar 20 that is carried by the frame beams 2. The shaft 18 also has a spur gear wheel 22 fixed thereto which meshes with the pinion 23 on a shaft 24.

The shaft 24 is connected, through suitable transmission, indicated by the case 25, with the shaft 26 of a motor 27 and may be provided with the usual fly-wheel 28 and clutch 29, the motor control devices, such as the throttle, spark and clutch levers being omitted for the reason that they form no part of the present invention, but may be of any ordinary type.

The ground wheels 8—8' are of the usual type employed in such mechanism and have the peripheral shoes 31 that afford tractive connection with the ground, and the sprocket wheels 10—12, with their driving belt 11, are inclosed in a suitable case 32 to house the parts and protect persons operating the device, or who might be injured thereby.

The front of the frame is supported on a fifth wheel mechanism, comprising the horizontally rotating wheel 34, having peripheral gear teeth 35 and a suspended frame 36, the latter carrying the front axle 37 upon which the guide wheels 38 are mounted. Meshing with the horizontal gear wheel 34 is a pinion 40 that is fixed on a vertical shaft 41, revolubly mounted in the frame cross bars 42—42', and also fixed on said vertical shaft is a worm wheel 43 which is in operative connection with a worm shaft 44 that is revolubly mounted in bearings 45—45' on the frame and has swivel connection with a steering rod 46 that extends to the rear of the frame and is there provided with a steering wheel 47, which is adapted for operation by a person sitting in the driver's seat 48 that is supported from the platform 4. The rear end of the steering rod is supported and journaled in an adjustable standard 49 that rises from the frame 2 and comprises the base part 50 and bearing member 51, which latter is adjustably fixed on the standard, preferably by bolts 52, so that the steering rod may be raised or lowered, the swivel connection of the rod with the worm shaft permitting such adjustment.

The adjustable mounting of the steering rod is provided in order that, if desired, the rod may be extended substantially parallel with the frame and to a point convenient for an operator riding on a follower that may be attached to the tractor, the extended position of the rod being indicated in dotted lines in Fig. III.

As illustrated in the drawings the tractor frame is quite narrow in order that it may pass between rows of standing grain without damaging the grain, and in order to obviate projecting parts I have utilized two driving wheels in the spaced relation mentioned and located the driving sprocket between the wheels and at the center of the frame, so that the sprocket wheel or chain need not project from the side of the tractor where they might interfere with the grain or be damaged thereby.

Fixed to the under side of the frame members, at the rear of the main frame, are brackets 53 (Fig. VIII) having free rear ends 54 spaced from the frame members to receive the flanges 55 of an angle iron 56 which is secured to a removable sub-frame 57, which latter is also preferably of angle iron construction and of such length that it projects laterally from both sides of the tractor frame, the front of the sub-frame being adapted for support from the brackets 53 and the rear from side members of the main frame by bolts 58, which extend through registering apertures in the supporting and supported frame, so that the sub-frame may be applied to the main frame by projecting the angle flanges 55 into the brackets 53 and bolting the rear portions of the sub-frame to the main frame members 2; it being apparent that with this construction the sub-frame may be easily and quickly applied to or removed from the main frame as desired.

Rotatably mounted in bearings 59 that are suspended from the ends of the sub-frame, is a shaft 60, and rotatably mounted on said shaft at opposite ends of the sub-frame are arms 61, the lower ends being provided with yokes 61' for carrying boxings 62 removably secured within said yokes by set screws 62' and within which a suspended shaft 63 is revolubly mounted. The said shaft 63 extends transversely across the sub-frame and therebeneath, and carries a suitable implement for working the ground over which the apparatus is driven. As here shown, the implement carried by the shaft 63 consists of a rotary harrow, comprising three or more sections, all of which are fixedly mounted on the shaft and operated thereby, as presently described.

Particularly referring to the use of the apparatus in a field of standing corn, it will be seen that the harrow tractor frame may pass between rows of standing grain. As such rows are usually slightly over thirty-six inches apart, I make the central harrow section of about thirty-six inches in length so that it may work the soil thoroughly between the rows of standing grain. The end sections are spaced from the central sections so as to leave an opening therebetween for the rows of the grain, each of the end sections being preferably of about half the length of the central section, so that the soil between adjacent rows at the sides of the apparatus will be worked for a half of the width of the row spacing and adjacent the inner rows. In this way, when working a field, the implement may be driven through alternate rows in order to completely work the field, as when it is driven between the first and second rows it will work all of the soil between such rows and one-half of the space at the outside of said rows, and when driven between the third and fourth rows it will completely work the space between these rows and the remaining space between the second and third rows, and a part of the space between the third and fourth. If it is desired additional sections may be inserted between the outer and central sections, as shown in Fig. IX, so that the entire surface may be harrowed; the inserted sections being so made that they may be inserted without the removal of the end sections.

The detail construction of the harrow preferably comprises forwardly inclined teeth 66, projecting from spirally placed tubes 66', and in order to secure the utmost benefit from the harrow I preferably rotate the sections during their forward travel, the mechanism for effecting the rotation preferably comprising sprocket wheels 67—68 on the harrow shaft 63 and frame shaft 60 respectively, over which a drive belt 69 is run, so that when the shaft 60 is rotated the harrow sections are rotated thereby to effect the proper treatment of the soil, the harrow sections being yieldingly urged onto the soil by their own gravity, because of the free pivotal mounting of the supporting arms on the shaft 60, and also by stiff springs 70 which are coiled about the shaft 60 and have end hooks 71—72 bearing against the sub-frame and against the arms respectively, and in a direction to tension the arms downwardly.

The shaft 60 is operatively connected with the motor 25 through a shaft 74 that is journaled in bearings 75 in one of the side frame beams 2 and has a sprocket wheel 76 at its forward end, over which a belt 77 is run, the belt being also run over a sprocket wheel 78 on the drive shaft 24, a suitable clutch, not shown, being provided for controlling the operative connection of the sprocket wheel 78 with the drive shaft. At its rear end the shaft 74 is provided with a miter-gear wheel 80 which meshes with a gear wheel 81 on a cross shaft 82 that is revolubly mounted in the side frame beam 2, and fixed to said cross shaft is a sprocket wheel 83, having a chain belt 84 run thereover and over a sprocket wheel 85 on the shaft 60, so that when the controlling clutch is in and the motor active, the shaft 60 will be rotated to rotate the harrow sections through the connection previously described.

I also provide means for lifting the harrow sections out of contact with the ground or adjusting the projection of the teeth 66, the mechanism for accomplishing such adjustment comprising segmental arms 87, having the shaft 60 as their center, the upper ends of which are slidably guided in brackets 88 on the ends of the sub-frame, the free ends of the arms passing through slots 89 in said brackets. The inner faces of said arms are provided with racks 90 and meshing with said racks are pinions 91, which are fixed on a cross-shaft 92 that is journaled in the ends of the sub-frame.

Fixed on the shaft 92 is a sprocket wheel 95, which is connected with a sprocket wheel 96 that is fixed on a sleeve 97, on the shaft 60, the sleeve 97 having a clutch face 98 adapted for coöperation with a clutch 99, having keyed relation with the shaft 60 and operable by a shift lever 101 and foot lever 102, so that when the clutch is in the chain 95 will be operated to rotate the shaft 92 and lift the harrow because of the meshing engagement of the pinion 91 with the rack arm 87.

As it is practical to plant immediately after the ground is worked by the harrow, I provide for attaching a planter to the rear of the frame so that the latter may follow the harrow and plant the seed, thereby saving a separate operation of the planter through the field after the ground has been prepared. This connection for the planter preferably comprises pairs of spaced, horizontal ears 105 at the rear of the tractor frame, and drag arms 106, having forward ends which may be located between the paired ears and connected therewith by pins 107 which may be dropped through apertures 108 in the ears and 109 in the drag arms. The rear ends of the drag arms are provided with apertures 110, through which pins 111 may be projected, so that when the rear ends of the drag arms are located between the paired ears 112 of a planter 113, the pins 111 may be projected through the ears and arms to pivotally connect the planter frame with the tractor.

By arranging the tractor brackets horizontally and the planter brackets vertically, it is apparent that a universal movement is provided, as the drag arms may swing horizontally in their planter frame mountings, so that any unevenness in the ground that will tend to throw the planter laterally or vertically would not effect a strain on the parts, as such movement would be compensated for in the universal connection.

With the tractor constructed as described, it is apparent that the harrow frame may be applied thereto and the implement driven through a field of young grain, to cultivate the same, and that a much greater area can be worked in one trip of the implement than with the ordinary devices, as the implement can work not only the row through which it is traveling but adjacent rows as well, and that by separating the harrow sections the shaft 62 may pass over the tops of the grain without damaging the same.

When it is desired to plant a field the present implement may be run through the field with the harrow and planter attached, the harrow sections working to prepare it for the planter and the planter following after the harrow to plant the seed, so that ground is prepared and planted at one travel of the implement.

While I have referred to certain specific uses of the implement, I do not wish to be understood as limiting myself thereto, as the adaptability of the implement for various uses is apparent.

Having thus described my invention, what I claim as new therein, and desire to secure by Letters-Patent, is:—

1. The combination with a main frame, of brackets suspended from the main frame and having rear ends spaced therefrom, a sub-frame having a member at one side provided with a flange for projection between the bracket ends and the main frame, and means for removably supporting the opposite side of the sub-frame from the main frame.

2. The combination with a main frame comprising spaced side beams having apertures therein at opposite sides of the frame and brackets suspended from said beams and spaced from said apertures, of a sub-frame comprising spaced side rails extending transversely beneath said tractor frame, one of said rails of the sub-frame being suspended from said brackets and the opposite rail having apertures therethrough in registration with the first named apertures and bolts extending through said registering frame apertures to secure the sub-frame in suspended position.

3. The combination with a main frame comprising spaced sidebeams having apertures therein at opposite sides of the frame and brackets suspended from said beams in spaced relation with said apertures and having their rear ends spaced from the supporting beams, of a sub-frame comprising spaced side rails extending transversely beneath said main frame, one of said rails having a hanger member attached thereto provided with a flange for projection between the bracket ends and the main frame, and the opposite side rail having apertures therein in registration with the main frame apertures and bolts extending through the said registering apertures to secure the sub-frame in suspended position.

In testimony whereof I affix my signature.

ANDREW H. REED.